Feb. 22, 1944.  L. W. BEAVEN  2,342,446
ROTARY ENGINE STRUCTURE
Filed Sept. 10, 1942  2 Sheets-Sheet 1
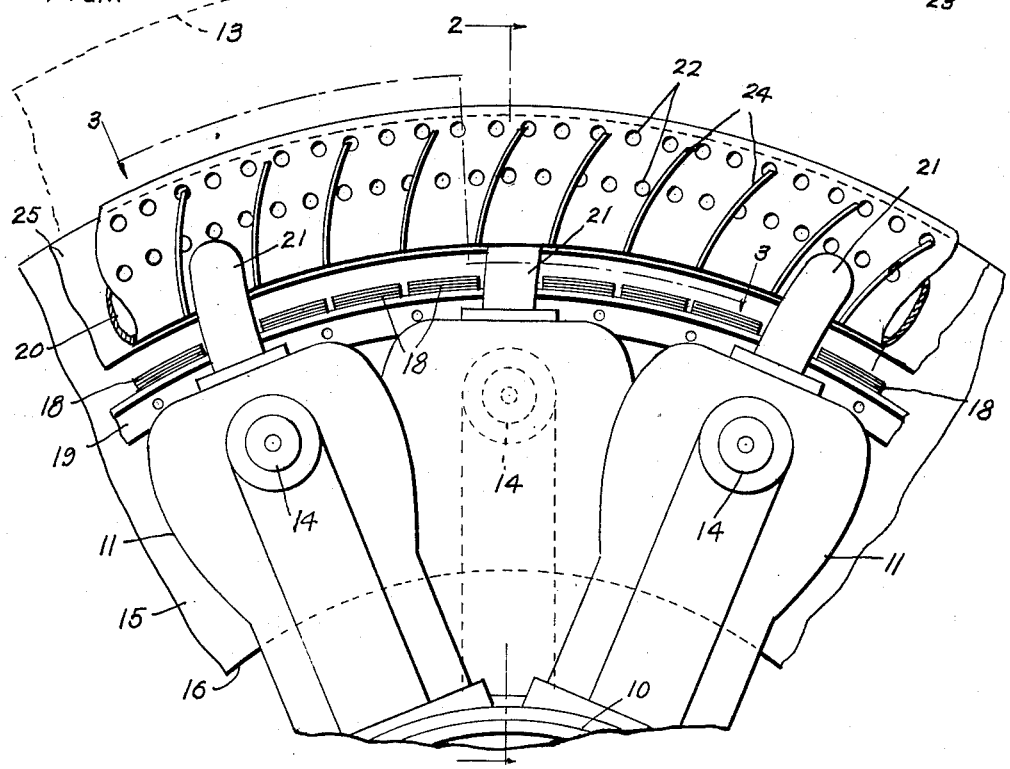
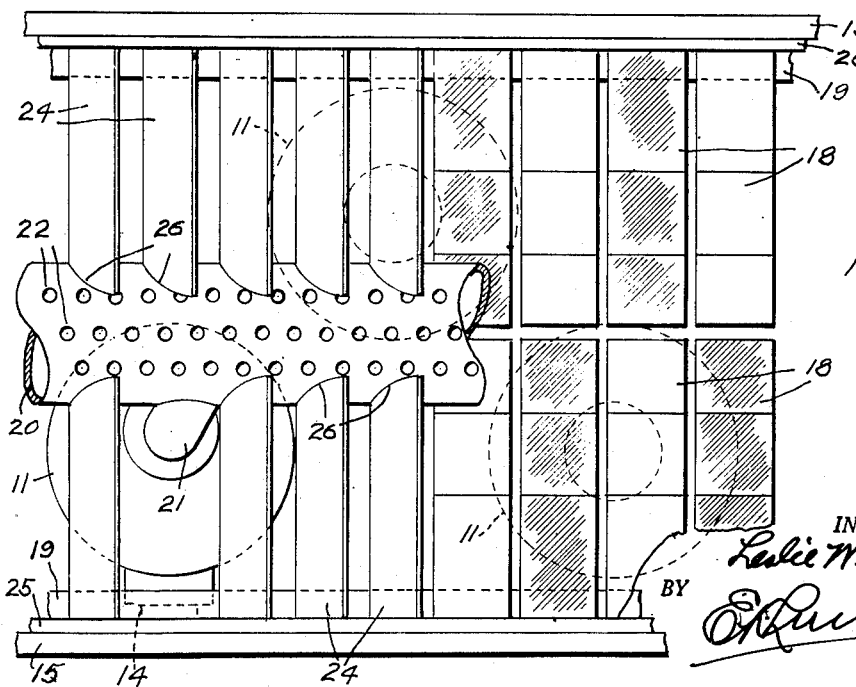
INVENTOR.
Leslie W. Beaven
BY Feb. 22, 1944.  L. W. BEAVEN  2,342,446
ROTARY ENGINE STRUCTURE
Filed Sept. 10, 1942  2 Sheets-Sheet 2

INVENTOR.
Leslie W. Beaven
BY E. K. Lundy, atty

Patented Feb. 22, 1944

2,342,446

UNITED STATES PATENT OFFICE 2,342,446

ROTARY ENGINE STRUCTURE

Leslie W. Beaven, Chicago, Ill.

Application September 10, 1942, Serial No. 457,813

1 Claim. (Cl. 123—171)

My present invention relates to internal combustion rotary engines, preferably of the four-cycle radial cylinder type, various designs of which are well-known in the art.

The present improvements relate primarily to means for cooling the cylinders and the exhaust pipe by materially increasing the volume of air flowing around the cylinders and through a suitable housing within which said cylinders are disposed.

The cooling structure contemplated herein is constructed in such a manner that its parts will act to reinforce or brace the cylinders to the engine casing or crank-case so as to maintain the cylinders in true radial positions and in alinement with each other. The improvements which I have devised are assembled directly with and are carried by the cylinders, and they have certain portions that are connected to the exhaust pipe or conduit that communicates with the discharge ports of the cylinders.

In carrying out my invention I have positioned parallel housing walls or annular plates alongside the row or rows of radial cylinders in spaced relation to the latter so that there is an open space between the outer edges of said walls or plates, said open space being spanned by thermostatic members that act as movable closures therefor.

Such structure, however, forms the subject matter of my Patent 2,300,094, October 27, 1942, and for which patent a reissue application was filed on July 15, 1943.

However, a portion of this prior invention will be described in order to give a clear understanding of the subject matter of the present application. The thermostatic closures referred to are preferably connected to and carried by the housing plates and are affected by thermal changes of the circulating air currents. For the purpose of increasing the velocity and volume of the air-current, there is mounted transversely disposed blower blades preferably upon the exhaust pipe, and they project from the sides thereof and have their outer ends anchored to the aforesaid housing walls or plates. Suitable tubular members connect the exhaust pipe to the exhaust ports of the cylinders and are anchored to said cylinders so that said members, together with the annular exhaust pipe will provide an efficient brace for the cylinders in association with the housing walls or plates.

The blower blades act in the manner of cooling fins on the exhaust pipe to assist in reducing the temperature thereof by dissipating the heat through radiation. Also, the use of blower blades in the manner herein disclosed will materially reduce or eliminate any tendency to create back-pressure within the exhaust pipe.

One of the aims of the present invention is to provide a structure of a novel character which is adapted to perform its required functions in an effective manner and to provide a sturdy structure capable of withstanding heavy duty and severe usage. The improvements which I have disclosed herein are of compact arrangement; they are exceedingly efficient in operation; and the structure is economical to produce as well as being capable of application or installation in engines of various designs.

The before-mentioned and other objects, aims, and advantages of my improvements will be obvious to persons who are skilled in the art after the construction and operation of this apparatus is understood from the within description. It is preferred to practice this improvement in substantially the manner hereinafter fully described and as more particularly enumerated in the appended claims. For a better understanding of my said improvements, reference is now made to the accompanying drawings that form a part of this specification.

In the drawings:

Figure 1 is a view partly in side elevation and partly in section showing a fragmentary portion of a rotary engine structure with my improvements incorporated therein, the view being taken along the plane of line 1—1 of Figure 2 with three of the cylinders shown. The adjacent and remaining cylinders are omitted in this view in the interest of clearness.

Figure 3 is a schematic plan view made on the plane of line 3—3 on Figure 2 with portions broken away.

Figure 2:
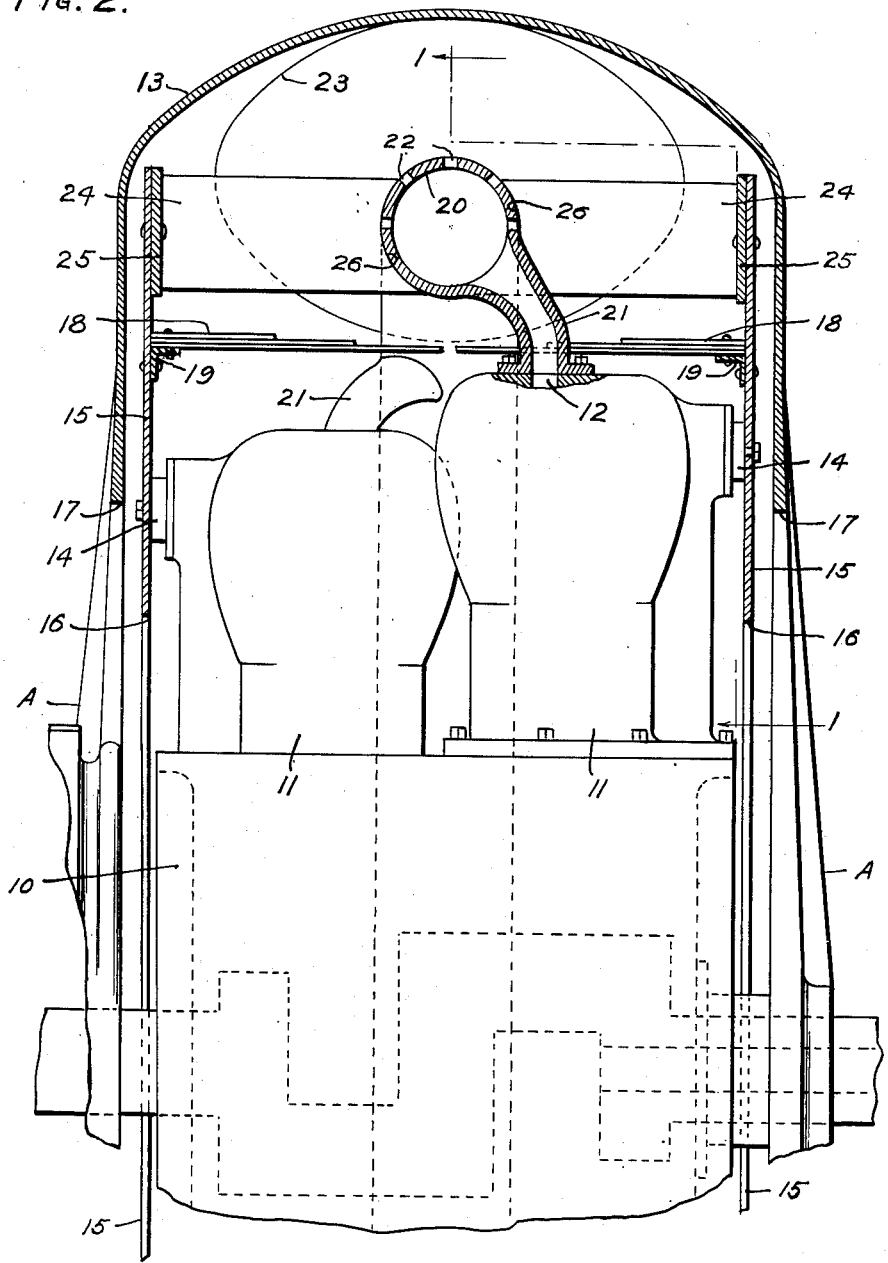
Figure 2 is a vertical transverse section taken on the plane of line 2—2 on Figure 1, looking in the direction of the arrows, and with the cylinders and crank-case in elevation.

The drawings are to be understood as being more or less schematic and disclose a typical or preferred form in which my invention may be made.

As illustrated in the drawings, A designates one of the members of a rigid supporting frame that is provided with bearings in which the trunnions of the rotatable engine crank-case 10 are journaled and which also provides support for the stationary or non-rotatable axial portions of the crank-shaft of the engine. A plurality of radially disposed cylinders 11 are mounted preferably in two side-by-side parallel rows on the crank-case 10 in concentric alinement and with their inner portions communicating with the interior of the crank-case to receive the fuel which is discharged into the latter through a bore in the crank-shaft.

The fuel passes into the combustion chambers of the cylinders through suitable intake ports in the pistons which reciprocate in the cylinders and are operatively connected to the eccentric portions of the crank-shaft. The products of combustion are scavenged from the cylinders through exhaust ports 12 communicating through the tops or heads of the combustion chambers of the cylinders. The intake and exhaust valves, which control the respective ports, are actuated by any suitable mechanism which controls their operation in the desired manner and properly timed with respect to each other.

The foregoing structure embodies an internal combustion engine of the rotary cylinder type having valved pistons, all of which is well known in the art and need not be described herein since the details thereof form no portion of the improvements which are contemplated herein.

A stationary hollow jacket 13 is secured to the supporting frame A and arches over the cylinders in the manner shown in Figure 2 of the drawings, whereby to protect portions of the engine and within which the engine cylinders revolve. Said jacket 13 is indicated in dotted lines in Figure 1 for the purpose of avoiding confusion with the other portions of the structure illustrated therein.

The cylinders 11 are provided upon their side faces with flat-surfaced embossments 14 to which portions of a suitable housing structure is secured. This housing preferably embodies metal plates 15 of circular outline each having a central opening 16 the edges of which are spaced from and are concentrically disposed with relation to the annular or cylindrical wall of the crank-shaft casing 10 of the engine, and said housing plates 15 have their outer margins disposed in the outer arched portion of the jacket 13 as shown in Figure 2. Said plates 15 are spaced from each other to provide an open-ended space for circulation of air about the cylinders 11, and the air is adapted to enter this space through said central openings 16 and will pass outwardly about the cylinders during rotation of the latter and thus assist in cooling said cylinders by coming in contact therewith. In order to readily admit the air to this housing, the side walls of the jacket are provided with openings 17 preferably centrally thereof, and are of larger diameters than the openings 16 in the housing plates.

The passage of air from the housing is controlled by means of automatically operable closures which constitute what may be termed the annular or cylindrical wall portion of the housing. These automatic closures embody a plurality of bi-metal thermostatic plates or louvers 18 that are preferably spaced apart and are assembled on the housing in a manner so that they may be flexed or bowed outwardly or inwardly according to the temperature of the air passing through the housing. These louvers are each preferably constructed of a plurality of flat leaves of uniformly graduated dimensions as shown in order to give them desired stability without hindering their ability to warp or flex. The leaves are preferably each formed of welded laminations of nickel-steel and brass, the latter having the greater co-efficient of expansion, will form the convex face of the louver when it is bowed by heat. The louvers are preferably assembled alike as to their respective long and short leaves, and if desired alternate louvers may be opposed to each other as to their bending or bowing action under the influence of heat, one louver having the brass side outermost and the next louver having the nickel-steel side outermost. Since the warping movement is an inverse ratio to the square of the thickness of the bi-metal, the desirable variations of the air passage are correctly ascertained by the predetermined gauge of the bi-metal plates which are used in assembling the louvers or closures.

As shown in the drawings, the louvers or thermostatic closures 18 project inwards towards each other from the respective housing plates 15 so that they terminate at their inner ends adjacent each other at approximately the center of width of the open-ended space between the spaced housing plates 15. The outer or anchored ends of said thermostatic closures are assembled side by side upon the lateral horizontally projecting flanges of angle-metal segments or annulae 19 that have their vertically disposed flanges secured to the housing walls 15 and project toward and terminate short of each other, as shown more clearly in Figure 2.

The exhaust ports 12 of the cylinders communicate with an annular or ring-shaped exhaust pipe 20 through hollow exhaust stubs 21 preferably integral with said exhaust pipe 20, or they may be separate elements attached to said exhaust pipe 20 to permit detachment therefrom if desired or necessary. The products of combustion which are scavenged from the combustion chambers of the cylinders are assisted by centrifugal force created by the spinning cylinders 11 and discharge from the exhaust pipe 20 preferably through apertures 22. These scavenged gases then enter the domed or arched portion of the jacket 13 from which they are passed into the atmosphere through the outlet 23 that is tangent to the jacket.

The exhaust gases becoming mixed with the cooler air in the jacket 13 will be contracted and, to a considerable extent, will muffle the sounds of the explosions.

The annular disposition of the exhaust pipe 20 encircling the outer ends or heads of the cylinders, and the rigid connection between said pipe and the cylinders through the medium of the stubs 21, provides an excellent and effective bracing and reinforcement of the cylinders, and the anchoring of the housing plates 15 to the cylinders will assist the crank-case to maintain the cylinders in their desired true axial disposition with their axes at right-angles to the axis of the engine casing 10, thus preventing said cylinders canting to one side or the other of their intended relative positions.

For the purpose of increasing the volume of air passing through the housing and to accelerate the flow thereof, there is provided means which are also adapted to materially lower the temperature of the exhaust pipe 20 through the medium of radiating elements that are connected to the exterior of said exhaust pipe. Such means embody a plurality of metal blades 24 or the like that preferably extend across the open end portions of the cylinder housing between the walls or plates 15 thereof. The said blades 24 are elongated, and are of somewhat concavo-convex cross-section as shown in Figure 1 of the drawings. Said impeller blades are disposed in an annular manner so that they provide, together with the housing walls 15, a blower device simulating the sirocco type.

The planes of the blades 24 are nearly radial to the axis of rotation of the housing and cylinders, and their concave faces are preferably disposed in the direction of their rotation so that they will effectively withdraw air from around the cylinders and through the housing and force this withdrawn air into the jacket 13. The outer ends of the impeller blades 24 are preferably anchored in any suitable manner to the housing plates 14 preferably near the outer margins of the latter. The opposite or inner end edges of said impeller blades 24 have concave recesses 26 formed therein that conform in shape with the curvature of the outer surface of the annular exhaust pipe 20. These said concave edges 26 of the impeller blades abut the exhaust pipe to which they are anchored preferably by welding or the like so that they are in intimate contact therewith or are practically integral with said exhaust pipe. The impeller blades 24 thus perform the additional function of cooling fins on said exhaust pipe and will materially assist in lowering the temperature of said pipe during operation of the engine. It will be understood that the term "exhaust pipe" as used herein is intended to and does include an exhaust muffler or similar device.

While I have described my invention in detail in its present preferred form or embodiment, it will be obvious to those skilled in the art, after understanding my invention, that various changes, modifications, and refinements may be made therein without departing from the spirit or scope thereof. I aim in the appended claim to cover all such changes, modifications and refinements.

What I claim is:

An internal combustion engine embodying a rotatable crank case, radial cylinders mounted upon the crank case, a housing within which said cylinders are disposed, said cylinders and said housing being simultaneously rotatable, said housing having an air inlet and an outlet, the latter being disposed beyond the heads of the cylinders, an exhaust pipe within the housing adjacent and spaced from the cylinder heads and encompassing the cylinder assembly, a rigid connection between the exhaust pipe and the respective cylinder heads forming discharges from the cylinders into the pipe, impeller blades extending across the outlet of the housing, whereby upon rotation of the housing a circulation of air will be created therethrough, said blades being supported by said pipe and the wall of said housing, thereby providing a rigid structure, and means disposed between the pipe and the heads of the cylinders and constituting a thermostatically controlled impediment for the air currents to control them, the said means being itself in turn controlled by the air currents, said exhaust pipe and the associated parts serving to reduce or relieve centrifugal stress on the crank case.

LESLIE W. BEAVEN.